(12) United States Patent
Hwang et al.

(10) Patent No.: US 7,584,102 B2
(45) Date of Patent: Sep. 1, 2009

(54) LANGUAGE MODEL FOR USE IN SPEECH RECOGNITION

(75) Inventors: Kwangil Hwang, Lowell, MA (US); Eric Fieleke, Medford, MA (US)

(73) Assignee: Scansoft, Inc., Peabody, MA (US)

( * ) Notice: Subject to any disclaimer, the term of this patent is extended or adjusted under 35 U.S.C. 154(b) by 1263 days.

(21) Appl. No.: 10/294,901

(22) Filed: Nov. 15, 2002

(65) Prior Publication Data
US 2004/0098263 A1    May 20, 2004

(51) Int. Cl.
*G10L 15/00* (2006.01)
(52) U.S. Cl. .................. 704/256; 704/235; 704/255; 704/242
(58) Field of Classification Search .......... 704/235, 704/255, 242, 256
See application file for complete search history.

(56) References Cited

U.S. PATENT DOCUMENTS

| | | | |
|---|---|---|---|
| 6,073,097 A * | 6/2000 | Gould et al. ............... 704/251 |
| 6,167,377 A * | 12/2000 | Gillick et al. .............. 704/240 |
| 6,212,498 B1 | 4/2001 | Sherwood et al. |
| 6,308,151 B1 * | 10/2001 | Smith ......................... 704/235 |
| 6,334,102 B1 * | 12/2001 | Lewis et al. ................ 704/255 |
| 6,418,431 B1 * | 7/2002 | Mahajan et al. ............... 707/4 |
| 6,430,551 B1 * | 8/2002 | Thelen et al. ................. 707/3 |
| 6,484,136 B1 * | 11/2002 | Kanevsky et al. .............. 704/9 |
| 6,901,364 B2 * | 5/2005 | Nguyen et al. ............. 704/235 |
| 7,035,789 B2 * | 4/2006 | Abrego et al. ................. 704/9 |
| 2003/0055642 A1 * | 3/2003 | Harada ....................... 704/246 |

OTHER PUBLICATIONS

Ryuichi Nisimura et al., "Automatic N-gram Language Model Creation from Web Resources," Eurospeech 2001—Scandinavia, vol. 3, Sep. 7, 2001, pp. 2127-2130.
J. Ido et al., "Robotic Receptioist ASKA: A Research Platfom for Human-Robot Interaction," Proceedings of the 2002 IEEE International Workshop on Robot and Human Interactive Communication, Sep. 25, 2002, pp. 306-311.
Besling et al., Language Model Speaker Adaptation, ESCA. Eurospeech'95, Sep. 1995, ISSN 1018-4074, pp. 1755-1758.
Seymore et al., Large-scale Topic Detection and Language Model Adaptation, School of Computer Science, Carnegie Mellon University, Pittsburgh, PA, Jun. 1997.
DeMori et al., Language Model Adaptation, Computational Models of Speech Pattern Processing, Keith Ponting (ed.), NATO ASI Series, Springer Verlag, 1999.
EPO Communication under Rule 51(4) EPC, Application No. 03 257 206.7-2225, mailed Feb. 9, 2007 (4 total pages).
Ramaswamy et al., *A Pervasive Conversational Interface For Information Interaction,* IBM Thomas J. Watson Research Center, Yorktown Heights, NY, Eurospeech, 1999, pp. 2663 ff. (4 total pages).

* cited by examiner

*Primary Examiner*—Daniel D Abebe
(74) *Attorney, Agent, or Firm*—Chapin IP Law, LLC

(57) ABSTRACT

Building a language model for use in speech recognition includes identifying without user interaction a source of text related to a user. Text is retrieved from the identified source of text and a language model related to the user is built from the retrieved text.

30 Claims, 5 Drawing Sheets

500

510

LANGUAGE MODEL FOR USE IN SPEECH RECOGNITION

TECHNICAL FIELD

This document relates to a language model for use in speech recognition.

BACKGROUND

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A speech recognition system may be a "discrete" system that recognizes discrete words or phrases but which requires the user to pause briefly between each discrete word or phrase. Alternatively, a speech recognition system may be a "continuous" system that can recognize spoken words or phrases irrespective of whether the user pauses between them. Continuous speech recognition systems typically have a higher incidence of recognition errors in comparison to discrete recognition systems due to complexities of recognizing continuous speech.

In general, the processor of a continuous speech recognition system analyzes "utterances" of speech. An utterance includes a variable number of frames and corresponds, for example, to a period of speech followed by a pause of at least a predetermined duration.

The processor determines what the user said by finding acoustic models that best match the digital frames of an utterance, and identifying text that corresponds to those acoustic models. An acoustic model may correspond to a word, a phrase, or a command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise.

The words or phrases corresponding to the best matching acoustic models are referred to as recognition candidates. The processor may produce a single recognition candidate for an utterance, or may produce a list of recognition candidates. In producing the recognition candidates, the processor may make use of a language model that accounts for the frequency at which words typically are used in relation to one another.

SUMMARY

In one general aspect, building a language model for use in speech recognition includes identifying without user interaction a source of text related to a user. Text is retrieved from the identified source of text and a language model related to the user is built from the retrieved text.

Implementations may include one or more of the following features. For example, emails sent by the user may be identified without user interaction as a source of text. The emails may be scanned to identify words from the emails and to determine which of the scanned words to use to build the language model.

Documents authored by the user, documents stored in a particular location on a computer, and/or contacts information of the user may be identified without user interaction as a source of text. Names from the user's contacts information may be retrieved and scanned to identify names that are not included in a vocabulary of words. The identified names may be added without user interaction to the vocabulary.

The retrieved text may be scanned to identify words from the text that are not included in a vocabulary of words and the identified words may be added without user interaction to the vocabulary.

The retrieved text may be scanned to identify words from the text that are not included in a vocabulary of words and the identified words may be displayed to the user. The user may be prompted to select words to be included in the vocabulary and the words selected by the user may be added to the vocabulary.

The language model may be built by calculating at least one of unigrams, bigrams, and trigrams using the retrieved text. The source of text may be identified without user interaction, the identified text may be retrieved, and the language model may be built as a part of a user's enrollment process.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings may indicate like elements.

DETAILED DESCRIPTION

Figure 1:
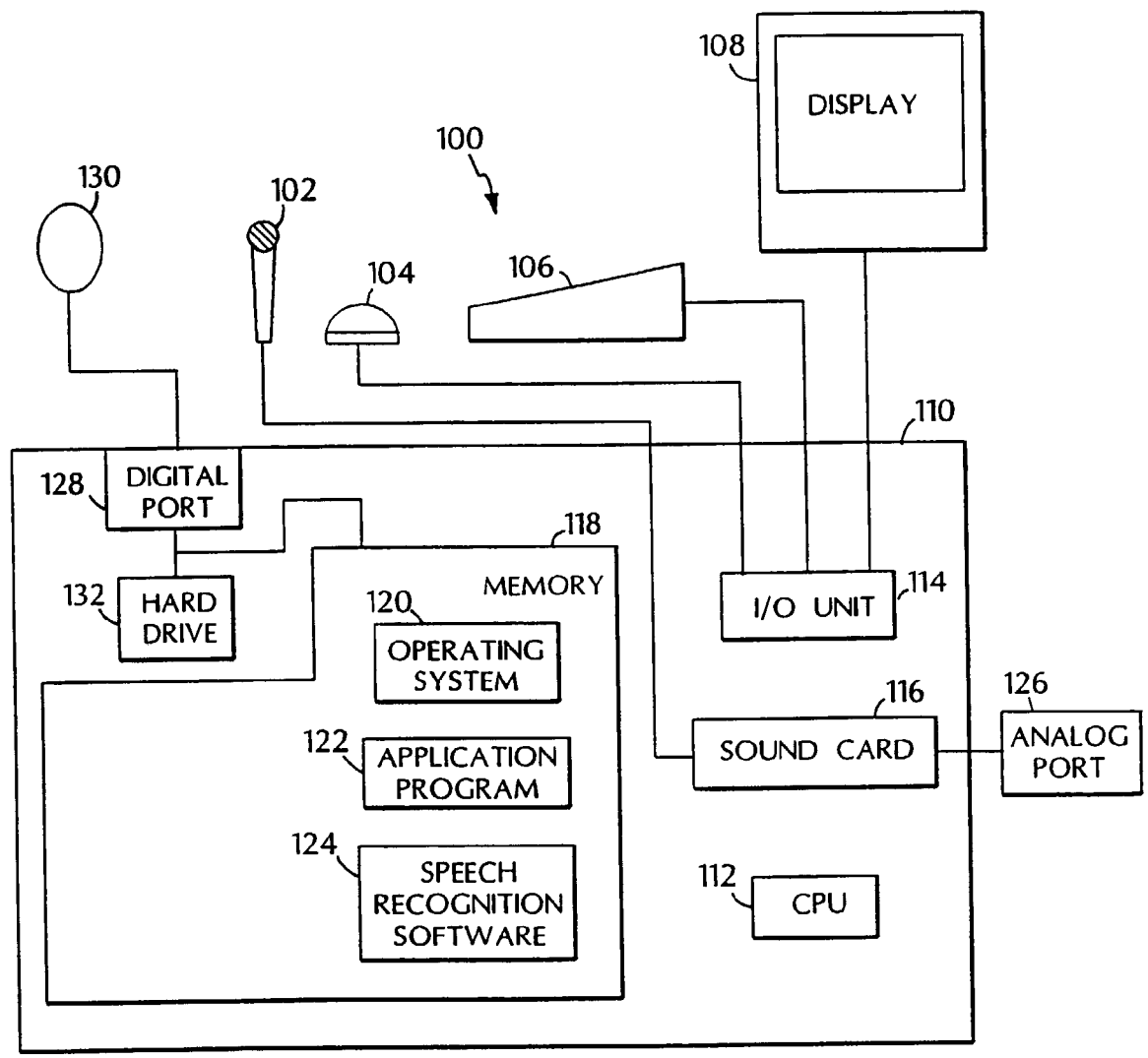
FIG. 1 is a block diagram of a speech recognition system.

Referring to FIG. 1, a speech recognition system 100 includes input/output (I/O) devices (for example, a microphone 102, a mouse 104, a keyboard 106 and a display 108) and a computer 110 having a central processing unit (CPU) 112, an I/O unit 114, and a sound card 116. A memory 118 stores data and programs such as an operating system 120 (e.g., DOS, Windows®, Windows® 95, Windows® 98, Windows® 2000, Windows® NT, Windows® Millennium Edition, Windows® XP, OS/2®, Macintosh OS, and Linux), an application program 122, and speech recognition software 124. Other examples of system 100 include a workstation, a server, a device, a component, other equipment or some combination thereof capable of responding to and executing instructions in a defined manner.

Examples of application programs 122 include authoring applications (e.g., word processing programs, database programs, spreadsheet programs, presentation programs, electronic mail programs and graphics programs) capable of generating documents or other electronic content, browser applications (e.g., Netscape's Navigator and Microsoft's Internet Explorer) capable of rendering standard Internet content, personal information management (PIM) programs (e.g., Microsoft® Outlook®, Outlook® Express, and Lotus Notes®) capable of managing personal information, and other programs (e.g., contact management software, time management software, expense reporting applications, and fax programs). Any of the Dragon NaturallySpeaking® versions, available from ScanSoft, Inc. of Peabody, Mass., offer examples of suitable speech recognition software 124.

The computer 110 may be used for speech recognition. In this case, the microphone 102 receives the user's speech and conveys the speech, in the form of an analog signal, to the sound card 116, which in turn passes the signal through an analog-to-digital (A/D) converter to transform the analog signal into a set of digital samples. Under control of the operating system 120 and the speech recognition software 124, the processor 112 identifies utterances in the user's speech. Utterances are separated from one another by a pause having a sufficiently large, predetermined duration (for example, 160-250 milliseconds). Each utterance may include one or more words of the user's speech.

The system also may include an analog recorder port 126 and/or a digital recorder port 128. The analog recorder port 126 is connected to the sound card 116 and is used to transmit speech recorded using an analog or digital hand-held recorder to the sound card. The analog recorder port 126 may be implemented using a line-in port. The hand-held recorder is connected to the port using a cable connected between the line-in port and a line-out or speaker port of the recorder. The analog recorder port 126 may be implemented as a microphone positioned so as to be next to the speaker of the hand-held recorder when the recorder is inserted into the port 126, and also may be implemented using the microphone 102. Alternatively, the analog recorder port 126 may be implemented as a tape player that receives a tape recorded using a hand-held recorder and transmits information recorded on the tape to the sound card 116.

The digital recorder port 128 may be implemented to transfer a digital file generated using a hand-held digital recorder 130. This file may be transferred directly into memory 118, or to a storage device such as hard drive 132. The digital recorder port 128 may be implemented as a storage device (for example, a floppy drive or CD-ROM drive) of the computer 110, or as an I/O port (e.g., a USB port).

Figure 2:
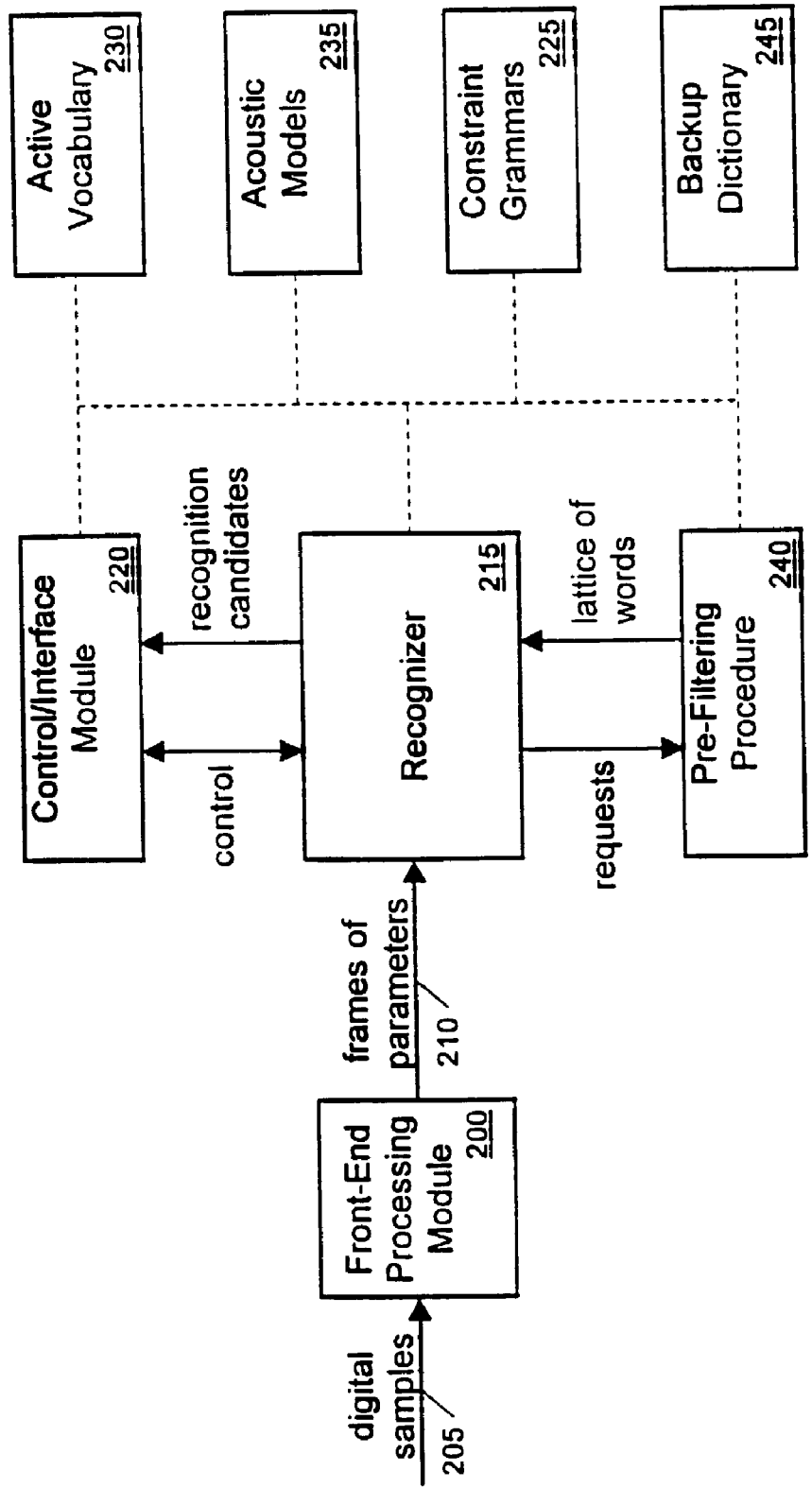
FIG. 2 is a block diagram of speech recognition software of the system of FIG. 1.

FIG. 2 illustrates components of the speech recognition software 124. For ease of discussion, the following description indicates that the components carry out operations to achieve specified results. However, it should be understood that each component typically causes the processor 112 to operate in the specified manner. The speech recognition software 124 typically includes one or more modules, such as a front end processing module 200, a recognizer, 215, a control/interface module 220, a constraint grammar module 225, an active vocabulary module 230, an acoustic model module 235, a pre-filtering module 240, and a backup dictionary module 245.

Initially, a front end processing module 200 converts the digital samples 205 from the sound card 116 (or from the digital recorder port 128) into frames of parameters 210 that represent the frequency content of an utterance. Each frame may include 24 parameters and represents a short portion (for example, 10 milliseconds) of the utterance.

A recognizer 215 receives and processes the frames of an utterance to identify text corresponding to the utterance. The recognizer 215 entertains several hypotheses about the text and associates a score with each hypothesis. The score reflects the probability that a hypothesis corresponds to the user's speech. For ease of processing, scores may be maintained as negative logarithmic values. Accordingly, a lower score indicates a better match (a high probability) while a higher score indicates a less likely match (a lower probability), with the likelihood of the match decreasing as the score increases. After processing the utterance, the recognizer 215 provides the best-scoring hypotheses to the control/interface module 220 as a list of recognition candidates, where each recognition candidate corresponds to a hypothesis and has an associated score. Some recognition candidates may correspond to text while other recognition candidates correspond to commands. Commands may include words, phrases, or sentences.

The recognizer 215 processes the frames 210 of an utterance in view of one or more constraint grammars 225. A constraint grammar, also referred to as a template or restriction rule, may be a limitation on the words that may correspond to an utterance, a limitation on the order or grammatical form of the words, or both. For example, a constraint grammar for menu-manipulation commands may include only entries from the menu (for example, "file", "edit") or command words for navigating through the menu (for example, "up", "down", "top", "bottom"). Different constraint grammars may be active at different times. For example, a constraint grammar may be associated with a particular application program 122 and may be activated when the user opens the application program 122 and deactivated when the user closes the application program 122. The recognizer 215 may discard any hypothesis that does not comply with an active constraint grammar. In addition, the recognizer 215 may adjust the score of a hypothesis associated with a particular constraint grammar based on characteristics of the constraint grammar.

Another constraint grammar 225 that may be used by the speech recognition software 124 is a large vocabulary dictation grammar. The large vocabulary dictation grammar identifies words included in the active vocabulary 230, which is the vocabulary of words known to the software. The large vocabulary dictation grammar also includes a language model that indicates the frequency with which words occur.

Other examples of constraint grammars 225 include an in-line dictation macros grammar for dictation commands, such as "CAP" or "Capitalize" to capitalize a word and "New-Paragraph" to start a new paragraph; a select X Y Z grammar used in selecting text; an error correction commands grammar; a dictation editing grammar; an application command and control grammar that may be used to control a particular application program 122; a global command and control grammar that may be used to control the operating system 120 and the speech recognition software 124; a menu and dialog tracking grammar that may be used to manipulate menus; and a keyboard control grammar that permits the use of speech in place of input devices, such as the keyboard 106 or the mouse 104.

The active vocabulary 230 uses a pronunciation model in which each word is represented by a series of phonemes that make up the phonetic spelling of the word. Each phoneme may be represented as a triphone that includes three nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files may contain all of the words, pronunciations and language model information for the user. Dictation and command grammars may be split between vocabulary files to optimize language model information and memory use, and to keep each single vocabulary file under a size limit. There also is a set of system vocabularies.

Separate acoustic models 235 are provided for each user of the system. Initially, speaker-independent acoustic models of male or female speech are adapted to a particular user's speech using an enrollment program. The acoustic models may be further adapted as the system is used. The acoustic models are maintained in a file separate from the active vocabulary 230.

The acoustic models 235 represent phonemes. In the case of triphones, the acoustic models 235 represent each triphone node as a mixture of Gaussian probability density functions ("PDFs"). For example, node "i" of a triphone "abc" may be represented as ab$^i$c:

$$ab^i c = \sum_k w_k N(\mu_k, c_k),$$

where each $w_k$ is a mixture weight, $$\sum_k w_k = 1,$$

$\mu_k$ is a mean vector for the probability density function ("PDF") $N_k$, and $c_k$ is the covariance matrix for the PDF $N_k$. Like the frames in the sequence of frames, the vectors $\mu_k$ each include twenty four parameters. The matrices $c_k$ are twenty-four-by-twenty-four matrices. Each triphone node may be represented as a mixture of up to, for example, sixteen different PDFs.

A particular PDF may be used in the representation of multiple triphone nodes. Accordingly, the acoustic models 235 represent each triphone node as a collection of mixture weights $w_k$ associated with up to sixteen different PDFs $N_k$ and separately represent each PDF $N_k$ using a mean vector $\mu_k$ and a covariance matrix $c_k$. Use of a particular PDF to represent multiple triphone nodes permits the models to include a smaller number of PDFs than would be required if each triphone node included entirely separate PDFs. Since the English language may be roughly represented using 43 different phonemes, there may be up to 79,507 (43$^3$) different triphones, which would result in a huge number of PDFs if each triphone node were represented by a separate set of PDFs. Representing multiple nodes with common PDFs also may remedy or reduce a data sparsity problem that results because some triphones (for example, "tzp" in the English language) rarely occur. These rare triphones may be represented by having closely-related triphones share the same set of PDFs.

A large vocabulary dictation grammar may include multiple dictation topics (for example, "medical" or "legal"), each having its own vocabulary file and its own language model. A dictation topic includes a set of words that represents the active vocabulary 230. In a typical example, a topic may include approximately 30,000 words that are considered for normal recognition.

A complete dictation vocabulary consists of the active vocabulary 230 plus a backup vocabulary 245. The backup vocabulary 245 may include files that contain user-specific backup vocabulary words and system-wide backup vocabulary words.

User-specific backup vocabulary words include words that a user has created while using the speech recognition software. These words are stored in vocabulary files for the user and for the dictation topic, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary.

In addition to the user-specific backup vocabulary noted above, there is a system-wide backup vocabulary. The system-wide backup vocabulary contains all the words known to the system, including words that may currently be in an active vocabulary.

The recognizer 215 may operate in parallel with a pre-filtering procedure 240. Upon initiating processing of an utterance, the recognizer 215 requests from the pre-filtering procedure 240 a list of words that may have been spoken as the first word of the utterance (that is, words that may correspond to the first and subsequent frames of the utterance). The pre-filtering procedure 240 performs a coarse comparison of the sequence of frames with the active vocabulary 230 to identify a subset of the vocabulary for which a more extensive comparison using the recognizer is justified.

The control/interface module 220 controls operation of the speech recognition software and provides an interface to other software or to the user. The control/interface module 220 receives the list of recognition candidates for each utterance from the recognizer. Recognition candidates may correspond to dictated text, speech recognition commands, or external commands. When the best-scoring recognition candidate corresponds to dictated text, the control/interface module 220 provides the text to an active application, such as a word processor. The control/interface module 220 also may display the best-scoring recognition candidate to the user through a graphical user interface. When the best-scoring recognition candidate is a command, the control/interface module 220 implements the command. For example, the control/interface module 220 may control operation of the speech recognition software 124 in response to speech recognition commands (for example, "wake up", "make that"), and may forward external commands to the appropriate software.

The control/interface module 220 also may control the active vocabulary 230, acoustic models 235, and constraint grammars 225 that are used by the recognizer 215. For example, when the speech recognition software 124 is being used in conjunction with a particular application program 122 (for example, Microsoft Word), the control/interface module 220 updates the active vocabulary 230 to include command words associated with that application and activates constraint grammars 225 associated with the application program 122.

Other functions provided by the control/interface module 220 include an enrollment program, a vocabulary customizer, and a vocabulary manager. The enrollment program collects acoustic information from a user and trains or adapts a user's models based on that information. The vocabulary customizer optimizes the language model of a specific topic by performing the process 300 described below with respect to FIG. 3. The vocabulary manager is a developer tool that is used to browse and manipulate vocabularies, grammars and macros. Each function of the control/interface module 220 may be implemented as an executable program that is separate from the main speech recognition software.

The enrollment program may operate in an interactive mode that guides the user through the enrollment process, or in a non-interactive mode that permits the user to enroll independently of the computer. In the interactive mode, the enrollment program displays the enrollment text to the user and the user reads the displayed text. As the user reads, the recognizer 215 uses the enrollment grammar to match a sequence of utterances by the user to sequential portions of the enrollment text. When the recognizer 215 is unsuccessful, the enrollment program prompts the user to repeat certain passages of the text. The recognizer uses acoustic information from the user's utterances to train or adapt acoustic models 235 corresponding to the matched portions of the enrollment text.

The control/interface module 220 also may implement error correction and cursor/position manipulation procedures of the software 124. Error correction procedures include a "make that" command and a "spell that" command. Cursor/position manipulation procedures include the "select" command discussed above and variations thereof (for example, "select [start] through [end]"), "insert before/after" commands, and a "resume with" command.

The control/interface module 220 may implement error correction procedures of the speech recognition software 124. When the speech recognition system 100 makes a recognition error, the user may invoke an appropriate correction command to remedy the error. During error correction, word searches of the backup dictionary 245 start with the user-specific backup dictionary and then check the system-wide backup dictionary. The backup dictionary 245 also is searched when there are new words in text that a user has typed.

In general, the backup dictionary 245 includes substantially more words than are included in the active vocabulary 230. For example, when the active vocabulary 230 has 60,000 or so entries, the backup dictionary 245 may have roughly 190,000 entries. The active vocabulary 230 is a dynamic vocabulary in that entries may be added or subtracted from the active vocabulary over time. For example, when the user indicates that an error has been made and the control/interface module 220 uses the backup dictionary 245 to correct the error, a new word from the backup dictionary 245 may be added to the active vocabulary 230 to reduce the likelihood that the error will be repeated.

The effective size of the active vocabulary 230 may be increased by dividing words into constituent components or word fragments. Word fragments include prefixes and suffixes, which are collectively known as affixes. A prefix is any word fragment that precedes another word fragment or word and therefore may be represented as "prefix+". For example, a common prefix used in the English language is "re+". In contrast to a prefix, a suffix is any word fragment that follows another word fragment or word. A suffix may be represented as "+suffix". For example, a common suffix used in the English language is "+ed".

Word fragments also include roots that can join with a prefix or a suffix. A root may be a true root, in which case it is not a complete word when used alone and therefore may be represented as "+root+". An example of a true root is "+crimin+" which may form the word "decriminalize" when preceded by prefix "de+" and followed by the suffixes, in succession, "+al" and "+ize". A root also may be a word root that is a word when used alone. For example, the word root "look" may be used as the word "look" or may be joined with other word fragments to form another word such as "looked".

Word fragments may also include separators, such as the "s" used in the German language to join words together or the hyphen, which is frequently used in the English language, and infixes, which are word fragments positioned in the interior of a word in such languages as Hungarian Mon-Khmer. For example, in the language Tagalog "tawa" means "laugh," but "t -um- awa" means "to laugh". Thus, -um- could represent an infix in the Tagalog language. As another example, in the Thai language, "pak" means "rest", however "p -n- ak" means "a support" such as a chair. Thus, -n- could represent an infix in the Thai language. Infixes are rare in the English language. An example of an informal infix used in English might be -bloody- as in "fan -bloody- tastic".

Each word fragment may be included as a separate entry in the active vocabulary 230 along with a set of active words that typically includes a large portion of the previously active words. The word fragments increase the effective size of the active vocabulary to include words that may be in the backup dictionary 245, designated as splittable words, that may be formed from combinations of word fragments with other word fragments or with active words. The words of the backup dictionary that may not be formed from these combinations are designated as non-splittable words.

When the recognizer 215 detects a word fragment in an utterance, the system combines the word fragment with one or more other word fragments or words to produce a new word, and then searches the backup dictionary 245 or applies rules to confirm that the new word is a valid word. Thus, the speech recognition system 100 is able to tap into the backup dictionary 245 without requiring the recognizer 215 to process words of the backup dictionary 245. By increasing the effective size of the active vocabulary 230, without increasing its real size, the recognition coverage of the speech recognition system 100 is expanded without significantly increasing the required memory capacity or processing time.

In one implementation, one or more language models may be employed by the recognizer. In determining the acoustic models that best match an utterance, the processor may consult a language model that indicates a likelihood that the text corresponding to the acoustic model occurs in speech. For example, one language model may include a bigram model that indicates the frequency with which a words occurs in the context of a preceding word. For instance, a bigram model may indicate that a noun or an adjective such as "word" is more likely to follow the word "the" than a verb such as "is."

The language model may be generated from a large sample of text. In general, probabilities produced by the language model do not change during use. However, the language model may change as words are added to or subtracted from the language model as the words are added to or subtracted from the active vocabulary. A language model associated with the large vocabulary dictation grammar may be a unigram model that indicates the frequency with which a word occurs independently of context, or a bigram model that indicates the frequency with which a word occurs in the context of a preceding word. For example, a bigram model may indicate that a noun or adjective is more likely to follow the word. The language model also may be a trigram model that indicates the frequency with which a word occurs in the context of two preceding words, or some other variation.

Another exemplary language model is a category language model that indicates the frequency with which a word occurs in the context of a preceding category. For example, a simple category model may include categories such as "nouns" or "adjectives." For instance, such a simple category model may indicate that the word "is" is more likely to follow words from the "nouns" category than words from the "adjectives" category. More complex category models may include categories such as "places," "sports adjectives," or "medical nouns." As with the word bigram model, the category model may be generated from a large sample of data and may include probabilities that do not change during use.

Other exemplary language models may include a unigram topic language model, a bigram topic language model, and a trigram topic language model, each of which may be based on a source of text associated with a user. In one implementation, the topic language model may include a single language model associated with a particular user that contains unigram, bigram, and trigram information.

The various language models discussed above may be included in a single language model or may be divided into one or more associated language models. Each user of the speech recognition system may have one or more language models.

Figure 3:
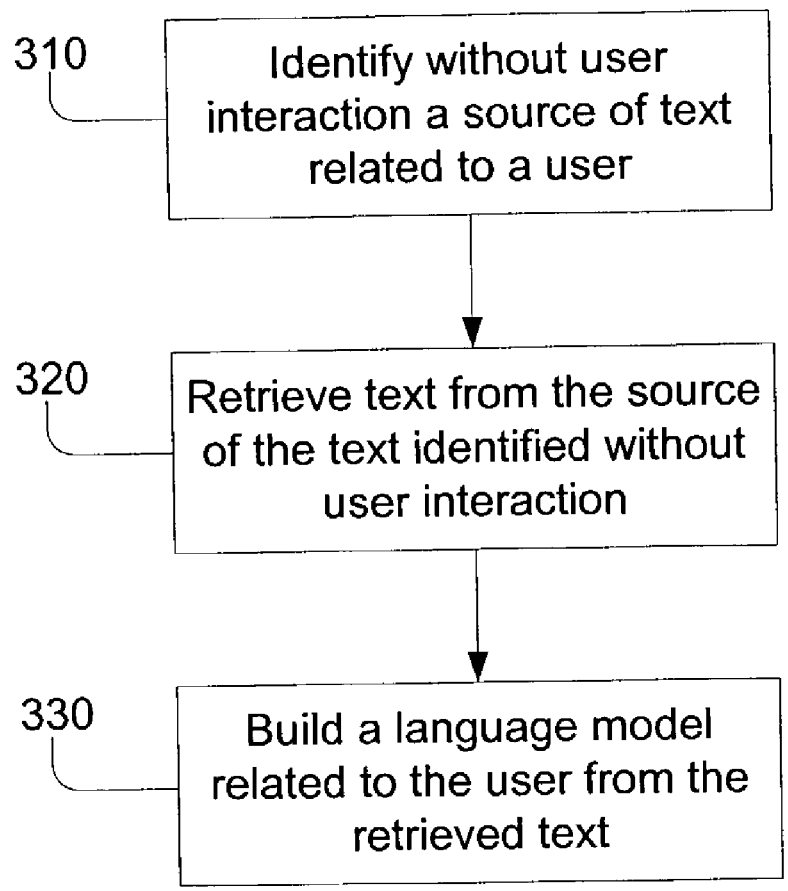
FIG. 3 is a flow chart of an exemplary process for building a language model.

FIG. 3 illustrates a process 300 for building a language model for use in speech recognition. Process 300 typically includes identifying without user interaction a source of text related to a user (step 310), retrieving text from the identified source of text without user interaction (step 320), and building a language model related to the user from the retrieved text (step 330).

Figure 4:
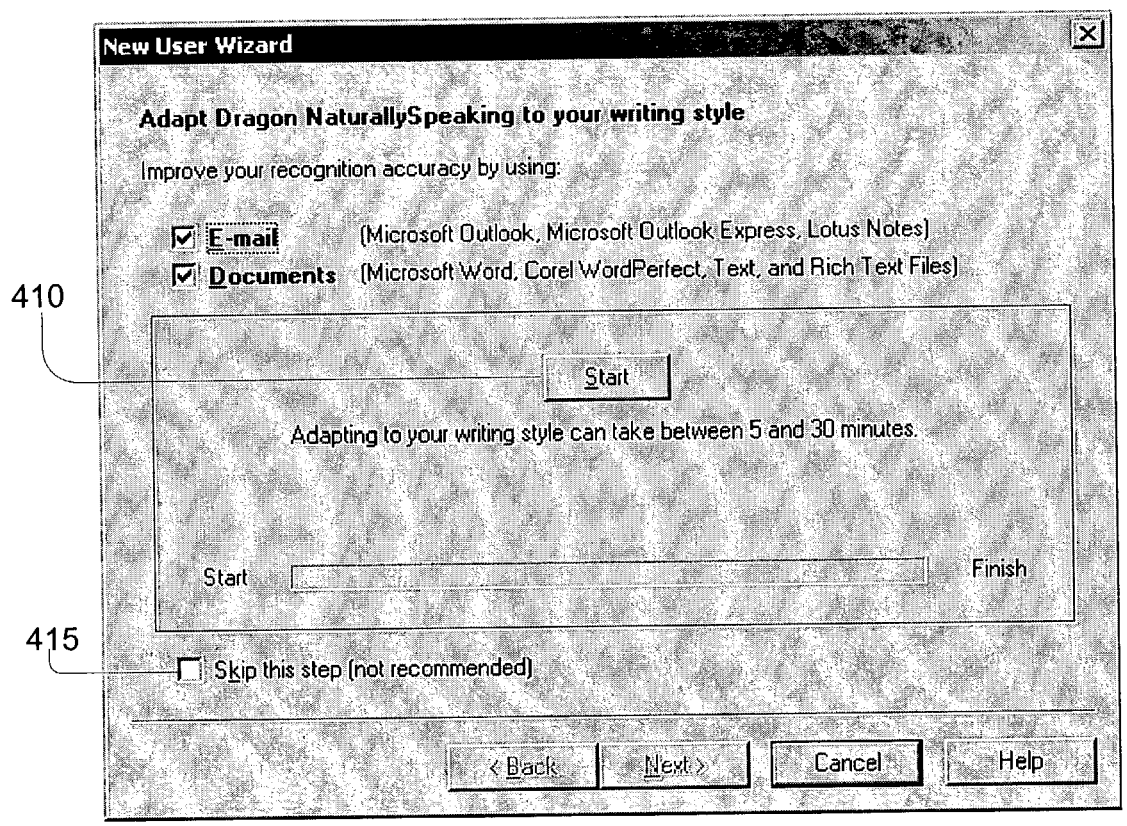
FIGS. 4 and 5 are screen shots of exemplary graphical user interfaces.

Process 300 automates the process of building a language model related to a user, and may be performed without user interaction. In one implementation, process 300 is performed as a part of a user's enrollment process. FIG. 4 illustrates an exemplary screen shot of a graphical user interface (GUI) 400 that may be presented to a user as part of a new user wizard during the enrollment process. In this implementation, the only user interaction that is necessary is a confirmation action by the user to confirm the start of the automated process 300. For instance, GUI 400 illustrates a "Start" button 410 that a user may select to initiate the process 300. Following this initial confirmation of the process 300, no further user interaction is required. The user has the option of skipping process 300 during the enrollment phase, such as by checking the box 415 labeled "Skip this step."

Figure 5:
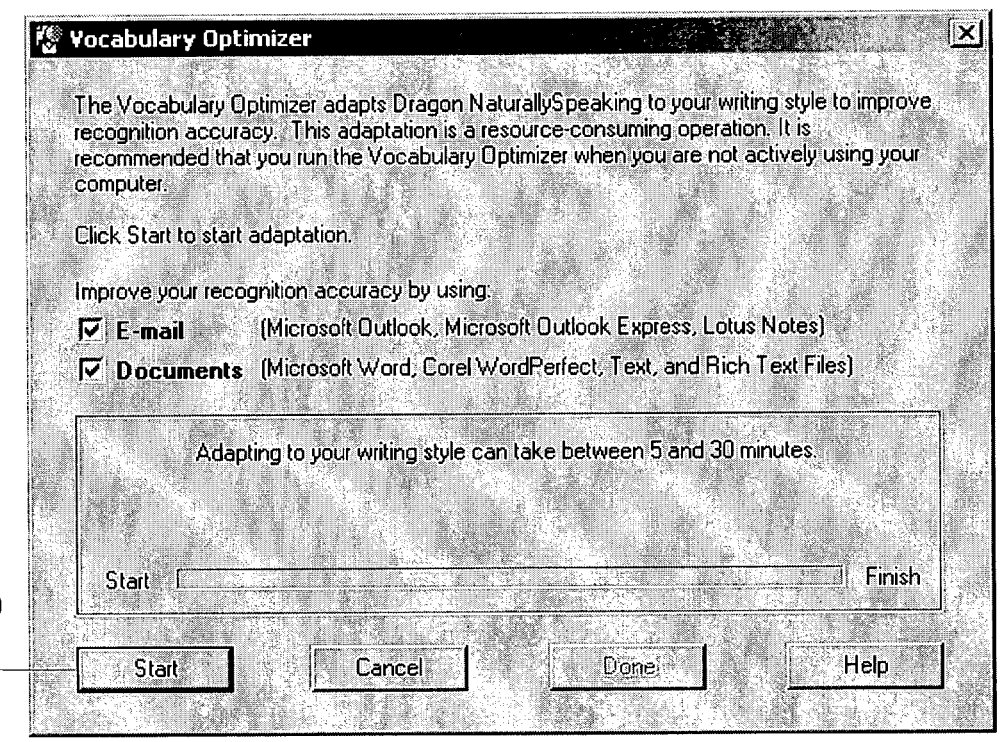

In another implementation, process 300 is performed at other times following the new user enrollment process. For example, the user may be prompted on a periodic or on a random basis to initiate process 300. In one implementation, a pop-up window is used to prompt the user. Additionally or alternatively, the user may choose to initiate process 300. FIG. 5 illustrates an exemplary screen shot of a GUI 500 that is presented to a user at times subsequent to the new user enrollment process. In this implementation, the only user interaction that is necessary is a confirmation action by the user to confirm the start of the automated process 300. For instance, GUI 500 illustrates a "Start" button 510 that a user may select to initiate the process 300. Once the start of the process is confirmed, the process is performed without further user interaction. Thus, process 300 may be performed multiple times, with the language model for the user being updated each time to improve the performance of speech recognition.

In one implementation, the entire process 300 is performed without user interaction. Without user interaction means that once the start of process 300 has been initiated or confirmed, then no user interaction is required for the performance of the process including identifying a source of the text related to a user (step 310), retrieving text from the source of the text identified (step 320), and building a language model related to the user from the retrieved text (step 330).

In another exemplary implementation, a portion of the process 300 is performed without user interaction and other portions of the process 300 are performed with user interaction. For example, identifying a source of text related to a user (step 310) may be performed without user interaction. Subsequent to identifying the source of the text (step 310), other portions of the process 300 may be performed with user interaction, such as, for example, prompting a user to select words to be included in a vocabulary that have been retrieved from the source of text.

As part of process 300, a source of text related to a user may be identified without user interaction (step 310). A source of text related to a user may include any files containing text associated with the user. In one implementation, to identify sources of text related to the user, process 300 may identify which application programs are stored on a user's computer. For instance, process 300 may identify without user interaction which PIM programs (e.g., Microsoft® Outlook®, Outlook® Express, and Lotus Notes®) are installed on the user's computer. Process 300 then may identify emails sent by the user as a source of text related to the user. For example, process 300 may use object linking and embedding (OLE) automation to identify a user's sent emails. Additionally or alternatively, process 300 may identify a user's contact information as a source of text related to the user.

In addition to a user's sent email and contact information, other sources of text related to the user may be identified, such as, for example, documents authored by the user and documents stored in a particular location on a computer (e.g., documents located in a Window user's My Document's folder). Different documents types that may be associated with different application programs (e.g., application programs 122 of FIG. 1) may be identified as sources of text for retrieval. For example, OLE automation may be used to identify specific document types (e.g., .doc, .html, .wpd, and .rtf).

Following identification of sources of text related to the user, process 300 includes retrieving text from the identified source of text (step 320). Retrieving text from the identified source may include retrieving the raw text. As part of the retrieval process, unwanted items may be filtered out from the source of text. For example, if the source of text is a user's sent email, then header information, address information, and reply information may be filtered out from the email. The reply information may be filtered by determining which text in the document is new and which text has been copied in a reply. Other items, including binary files and documents in other languages, may be identified and filtered out during the retrieving process.

In one implementation, filter rules may be used to determine from which documents to retrieve the text. One or more filter rules may be used simultaneously. For example, one filter rule may include only documents that have been edited within a certain time period (e.g., within the last ninety days). Another filter rule may include only documents that have a certain number of characters of text (e.g., greater than 512 characters of text).

After the text has been retrieved (step 320), a language model related to the user is built using the retrieved text (step 330). One or more language models may be built using the information retrieved from the text. In one exemplary implementation, a language model for the particular user is built using counts of words from the raw text. The language model may include a unigram language model, a bigram language model, and/or a trigram language model. The different language models (e.g., unigram, bigram, and trigram) may be included in a single combined language model for the particular user or may be in separate language models for the particular user.

The language model may be built by adding the retrieved words to one or more of the vocabularies. For example, the retrieved words may be scanned to determine which words are new to the vocabulary versus which words already appear in the vocabulary. In one implementation, the new words may be added to the vocabulary without user intervention. For example, when text is retrieved from a user's contact information, the names that appear in the contact information may be added to the vocabulary without user interaction. Similarly, new words that appear from other sources of text, such as, for example, the user's sent email, documents authored by the user, and documents in the user's My Documents folder, may be added to the vocabulary without user intervention. For words that were added to the vocabulary, the system 100 may use punctuation guessing to determine the pronunciation of the words. Alternatively, the system may determine the pronunciation of the new words by prompting the user to speak the new words.

In another implementation, the retrieved words that are scanned and determined to be new words may be displayed to the user. The user may be prompted to select which words to add to the vocabulary.

In one exemplary implementation, a constraint may be placed on the duration of process 300. For example, process 300 may be set to perform for up to a certain time period (e.g., thirty minutes). If the set time period is reached prior to completing the process 300, then the results of the process performed up to that time are saved and the process is terminated. The duration constraint may be used to limit the time during which a user's computer may be unavailable. The process 300 also may configured to run as a background process.

In another exemplary implementation, a constraint may be placed on the amount of raw text retrieved from the identified sources of text. For example, an upper limit of text may be set (e.g., one megabyte) such that the process only performs up to that limit.

In one exemplary implementation, each user may have multiple vocabularies. Process 300 may be performed once and the word counts obtained from the retrieved text may be applied to each of the different vocabularies. Additionally or alternatively, process 300 may be performed for each vocabulary.

The speech recognition performance can be substantially improved if the language model is well matched to the dictated text. The automated aspect of process 300 makes it less burdensome on the user to build a language model related to the user by locating, without user intervention, sources of text which are likely to be well matched to text created by a particular user. A user may be less likely to build a language model if the user is required to perform multiple steps. For example, it may be tedious and less efficient for the user to locate, identify, and submit sources of text for use in building the language model. It also may be cumbersome to require the user to participate in subsequent interactions after the user has located, identified, and submitted sources of text, such as, for example, selecting or acknowledging which words from the submitted source of text to include in the language model and/or to add to the vocabulary.

The described systems, methods, and techniques may be implemented in digital and/or analog electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for building a user-specific language model for use in speech recognition by a user in which at least one computer system accesses instructions from computer storage and executes the instructions comprising steps of:

identifying without user interaction one or more sources of non-verbal, electronically embedded, and previously created text that is related to the user and that is located only on a user's personal storage, the identified sources of text comprising at least one email sent by the user;

retrieving text from the identified one or more sources of text; and building a user-specific language model related to the user using only the retrieved text from the identified one or more sources of previously created text that is related to the user and is located only on the user's personal storage.

2. The method as in claim 1 further comprising:

scanning the emails to identify words from the emails; and determining which of the scanned words to use to build the language model.

3. The method as in claim 2, wherein scanning the emails includes:

identifying at least one word in the email sent by the user to add to a vocabulary of the language model.

4. The method as in claim 3, wherein identifying the word in the email sent by the user to add to the vocabulary of the language model includes:

applying at least one filter rule to disregard text from at least one of: header information of the email and address information of the email; and upon applying the filter rule, selecting at least one word in remaining text of the email.

5. The method as in claim 3, wherein identifying the word in the email sent by the user to add to the vocabulary of the language model includes:

applying at least one filter rule to disregard reply text in the email message, the reply text copied into the email message from at least one previously transmitted email message; and upon applying the filter rule, selecting at least one word in remaining text of the email.

6. The method as in claim 1 wherein identifying the one or more sources of text includes identifying without user interaction documents authored by the user.

7. The method as in claim 1 wherein identifying the one or more sources of text includes identifying without user interaction documents stored in a particular location on a computer.

8. The method as in claim 1 wherein identifying the one or more sources of text includes identifying without user interaction contacts information of the user.

9. The method as in claim 8 wherein retrieving the text includes retrieving names from the user's contacts information and further comprising:
   scanning the names to identify names that are not included in a vocabulary of words; and
   adding without user interaction the identified names to the vocabulary.

10. The method as in claim 1 further comprising:
    scanning the retrieved text to identify words from the text that are not included in a vocabulary of words; and
    adding without user interaction the identified words to the vocabulary.

11. The method as in claim 1 wherein building the language model includes calculating at least one of unigrams, bigrams, and trigrams using the retrieved text.

12. The method as in claim 1 further comprising performing the identifying, retrieving and building as a part of a user's enrollment process.

13. The method as in claim 1, wherein retrieving text from the identified one or more sources of text includes:
    retrieving at least one document containing at least a required number of characters.

14. A method for building a user-specific language model for use in speech recognition by a user in which at least one computer system accesses instructions from computer storage and executes the instructions comprising steps of:
    identifying without user interaction a source of text created by the user, the identified source of text comprising at least one email sent by the user;
    retrieving text from the identified source of text;
    building a user-specific language model related to the user using only the retrieved text;
    scanning the retrieved text to identify words from the text that are not included in a vocabulary of words;
    displaying the identified words to the user;
    prompting the user to select words to be included in the vocabulary; and
    adding words selected by the user to the vocabulary.

15. A computer program for building a user-specific language model for use in speech recognition by a user, the computer program described according to computer code stored on a computer readable storage medium, the computer code comprising:
    an identifying code segment that causes a computer to identify without user interaction one or more sources of non-verbal, electronically embedded, and previously created text that is related to the user and that is located only on a user's personal storage;
    a retrieving code segment that causes the computer to retrieve text from the identified one or more sources of text, the identified sources of text comprising at least one email sent by the user; and
    a building code segment that causes the computer to build a user-specific language model related to the user using only the retrieved text from the identified one or more sources of previously created text that is related to the user and that is located only on the user's personal storage.

16. The computer program of claim 15 further comprising:
    a scanning code segment that causes the computer to scan the emails to identify words from the emails; and
    a determining code segment that causes the computer to determine which of the scanned words to use to build the language model.

17. The computer program of claim 15 wherein the identifying code segment causes the computer to identify without user interaction documents authored by the user.

18. The computer program of claim 15 wherein the identifying code segment causes the computer to identify without user interaction documents stored in a particular location on a computer.

19. The computer program of claim 15 wherein the identifying code segment causes the computer to identify without user interaction contacts information of the user.

20. The computer program of claim 19 wherein the retrieving code segment causes the computer to retrieve names from the user's contacts information and further comprising:
    a scanning code segment that causes the computer to scan the names to identify names that are not included in a vocabulary of words; and
    an adding code segment that causes the computer to add without user interaction the identified names to the vocabulary.

21. The computer program of claim 15 further comprising:
    a scanning code segment that causes the computer to scan the retrieved text to identify words from the text that are not included in a vocabulary of words; and
    an adding code segment that causes the computer to add without user interaction the identified words to the vocabulary.

22. The computer program of claim 15 wherein the building code segment causes the computer to calculate at least one of unigrams, bigrams, and trigrams using the retrieved text.

23. The computer program of claim 15 further comprising a performing code segment that causes the computer to perform the identifying code segment, the retrieving code segment and the building code segment as a part of a user's enrollment process.

24. A computer program for building a user-specific language model for use in speech recognition by a user, the computer program described according to computer code stored on a computer readable storage medium, the computer code comprising:
    an identifying code segment that causes a computer to identify without user interaction a source of text created by the user, the source of text comprising at least one email sent by the user;
    a retrieving code segment that causes the computer to retrieve text from the identified source of text;
    a building code segment that causes the computer to build a user-specific language model related to the user using only the retrieved text;
    a scanning code segment that causes the computer to scan the retrieved text to identify words from the text that are not included in a vocabulary of words;
    a displaying code segment that causes the computer to display the identified words to the user;
    a prompting code segment that causes the computer to prompt the user to select words to be included in the vocabulary; and
    an adding code segment that causes the computer to add words selected by the user to the vocabulary.

25. A system for building a user-specific language model for use in speech recognition by a user, comprising:
- means for identifying without user interaction one or more sources of non-verbal, electronically embedded, and previously created text that is related to the user and that is located only on a user's personal storage, the identified sources of text comprising at least one email sent by the user;
- means for retrieving text from the identified one or more sources of text; and
- means for building a user-specific language model related to the user using only the retrieved text from the identified one or more sources of previously created text that is related to the user and that is located only on the user's personal storage.

26. A method for building a user-specific language model for use in speech recognition by a user in which at least one computer system accesses instructions from computer storage and executes the instructions comprising steps of:
- identifying without user interaction sources of non-verbal and electronically embedded text related to the user and located only on a user's personal storages, the identified sources of text comprising at least one email sent by the user;
- retrieving text from the identified sources of text; and
- building a language model related to the user using only the retrieved text from the identified sources of text related to that user and located only on the user's personal storage.

27. The method as in claim 26 wherein identifying the sources of text includes identifying without user interaction documents authored by the user.

28. The method as in claim 26 wherein identifying the sources of text includes identifying without user interaction documents stored in a particular location on a computer.

29. The method as in claim 26 further comprising:
- scanning the retrieved text to identify words from the text that are not included in a vocabulary of words; and
- adding without user interaction the identified words to the vocabulary.

30. A method for building a user-specific language model for use in speech recognition by a user in which at least one computer system accesses instructions from computer storage and executes the instructions comprising steps of:
- identifying without user interaction sources of text related to the user, the identified sources of text comprising at least one email sent by the user;
- retrieving text from the identified sources of text;
- building a language model related to the user using only the retrieved text;
- scanning the retrieved text to identify words from the text that are not included in a vocabulary of words;
- displaying the identified words to the user;
- prompting the user to select words to be included in the vocabulary; and
- adding words selected by the user to the vocabulary.

* * * * *